(12) United States Patent
Paknad et al.

(10) Patent No.: US 8,131,719 B2
(45) Date of Patent: Mar. 6, 2012

(54) SYSTEMS AND METHODS FOR UTILIZING ORGANIZATION-SPECIFIC CLASSIFICATION CODES

(75) Inventors: Deidre Paknad, Mountain View, CA (US); Puttappaiah Muniyappa, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 11/505,665

(22) Filed: Aug. 16, 2006

(65) Prior Publication Data

US 2011/0173202 A1    Jul. 14, 2011

(51) Int. Cl.
*G06F 7/00* (2006.01)
*G06F 17/30* (2006.01)

(52) U.S. Cl. ........................ 707/736; 707/917
(58) Field of Classification Search ............. 707/104.1, 707/736; 705/1
See application file for complete search history.

(56) References Cited

U.S. PATENT DOCUMENTS

| | | | |
|---|---|---|---|
| 5,355,497 A | 10/1994 | Cohen-Levy | |
| 5,701,472 A | 12/1997 | Koerber et al. | |
| 5,903,879 A | 5/1999 | Mitchell | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,539,379 B1 | 3/2003 | Vora et al. | |
| 6,622,128 B1 | 9/2003 | Bedell et al. | |
| 6,738,760 B1 | 5/2004 | Krachman | |
| 6,944,597 B2 | 9/2005 | Callen et al. | |
| 7,076,439 B1 | 7/2006 | Jaggi | |
| 7,127,470 B2 * | 10/2006 | Takeya | 707/805 |
| 7,197,716 B2 | 3/2007 | Newell et al. | |
| 7,283,985 B2 | 10/2007 | Schauerte et al. | |
| 7,386,468 B2 | 6/2008 | Calderaro et al. | |
| 7,433,832 B1 | 10/2008 | Bezos et al. | |
| 7,895,229 B1 | 2/2011 | Paknad | |
| 2002/0007333 A1 | 1/2002 | Scolnik et al. | |
| 2002/0010708 A1 * | 1/2002 | McIntosh | 707/500 |
| 2002/0022982 A1 | 2/2002 | Cooperstone et al. | |
| 2002/0083090 A1 * | 6/2002 | Jeffrey et al. | 707/501.1 |
| 2002/0103680 A1 | 8/2002 | Newman | |
| 2002/0143595 A1 | 10/2002 | Frank et al. | |
| 2002/0143735 A1 * | 10/2002 | Ayi et al. | 707/1 |
| 2002/0184068 A1 | 12/2002 | Krishnan et al. | |
| 2002/0184148 A1 | 12/2002 | Kahn et al. | |

(Continued)

OTHER PUBLICATIONS

U.S. Appl. No. 12/215,866, filed Jun. 27, 2008, Deidre Paknad, System and Method for Managing Legal Obligations for Data.

(Continued)

*Primary Examiner* — Angela Lie
*Assistant Examiner* — Kris Mackes
(74) *Attorney, Agent, or Firm* — Shumaker & Sieffert, P.A.

(57) ABSTRACT

Systems and methods for classifying a document are provided. In exemplary embodiments, an organization specific classification code (OSCC) is used to classify the document or data. The OSCC is a classification code based on an information type and an organization. In some embodiments, one or more policies may be associated with the OSCC.

34 Claims, 5 Drawing Sheets

U.S. PATENT DOCUMENTS

| | | | |
|---|---|---|---|
| 2003/0004985 A1* | 1/2003 | Kagimasa et al. | 707/500 |
| 2003/0014386 A1 | 1/2003 | Jurado | |
| 2003/0046287 A1 | 3/2003 | Joe, Jr. | |
| 2003/0051144 A1 | 3/2003 | Williams | |
| 2003/0069839 A1 | 4/2003 | Whittington et al. | |
| 2003/0097342 A1 | 5/2003 | Whittingtom | |
| 2003/0110228 A1 | 6/2003 | Xu et al. | |
| 2003/0229522 A1 | 12/2003 | Thompson et al. | |
| 2004/0034659 A1 | 2/2004 | Steger | |
| 2004/0060063 A1 | 3/2004 | Russ et al. | |
| 2004/0068432 A1 | 4/2004 | Meyerkopf et al. | |
| 2004/0088283 A1* | 5/2004 | Lissar et al. | 707/3 |
| 2004/0088332 A1 | 5/2004 | Lee | |
| 2004/0088729 A1 | 5/2004 | Petrovic et al. | |
| 2004/0138903 A1 | 7/2004 | Zuniga | |
| 2004/0187164 A1 | 9/2004 | Kandasamy et al. | |
| 2004/0193703 A1* | 9/2004 | Loewy et al. | 709/220 |
| 2004/0204947 A1 | 10/2004 | Li et al. | |
| 2004/0260569 A1 | 12/2004 | Bell et al. | |
| 2005/0071251 A1 | 3/2005 | Linden et al. | |
| 2005/0114241 A1 | 5/2005 | Hirsch et al. | |
| 2005/0203821 A1 | 9/2005 | Petersen et al. | |
| 2006/0095421 A1 | 5/2006 | Nagai | |
| 2006/0136435 A1 | 6/2006 | Nguyen | |
| 2006/0230044 A1 | 10/2006 | Utiger | |
| 2007/0100857 A1* | 5/2007 | DeGrande et al. | 707/101 |
| 2007/0156418 A1 | 7/2007 | Richter et al. | |
| 2007/0162417 A1 | 7/2007 | Cozianu et al. | |
| 2007/0271517 A1 | 11/2007 | Finkelman et al. | |
| 2009/0037376 A1 | 2/2009 | Archer et al. | |

OTHER PUBLICATIONS

U.S. Appl. No. 11/512,880, filed Aug. 29, 2006, Deidre Paknad, Systems and Methods for Providing a Map of an Active Enterprise System.

U.S. Appl. No. 11/807,145, filed May 24, 2007, Deidre Paknad, Conducting Cross-Checks on Legal Matters Across an Enterprise System.

U.S. Appl. No. 11/901,020, filed Sep. 14, 2007, Deidre Paknad, Proactively Determining Evidence Issues on Legal Matters Involving Employee Status Changes.

U.S. Appl. No. 12/214,935, filed Jun. 23, 2008, Deidre Paknad, System and Method for Leveraging Historical Data to Determine Affected Entities.

U.S. Appl. No. 11/505,537, filed Aug. 16, 2006, Deidre Paknad, Systems and Methods for Utilizing an Enterprise Map to Determine Affected Entities.

"mySAAP ERP Human Capital Management: Maximizing Workforce Potential", <a href="http://web.archive.org/web/20060823140053/www.sap.com/solutions/businesss-suite/erp/hcm/index.exp"?http://web.archive.org.web/2006...</a>, Aug. 18, 2006.

Zhu et al., "Query Expansion Using Web Access Log Files," Lecture Notes in Computer Science, 2005, vol. 3588/2005, pp. 686-695, Springer-Verlag Berlin Heidelberg, 2005.

www.pss-systems.com retrieved from www.archive.org any linkage Dec. 5, 2008.

www.pss-systems.com retrieved from www.archive.org Dec. 8, 2005.

* cited by examiner

SYSTEMS AND METHODS FOR UTILIZING ORGANIZATION-SPECIFIC CLASSIFICATION CODES

CROSS REFERENCE TO RELATED APPLICATION

The present application is related to U.S. patent application Ser. No. 11/505,537, filed Aug. 16, 2006 and entitled "Systems and Methods for Utilizing an Enterprise Map to Determine Affected People," which is herein incorporated by reference.

BACKGROUND OF THE INVENTION

1. Field of the Invention

Embodiments of the present invention relate generally to data management and more particularly to an organization-specific classification system for data management.

2. Description of Related Art

Traditionally, document and record management systems utilize a classification code, such as a unique name, to assign a document type to an instance or group of documents. For some systems, more structure may be required for classifying documents. In some instances, companies may create and maintain information taxonomies, which may or may not be hierarchical, in order to handle the classification codes.

Furthermore, companies may desire to set policies based on classification codes. There may be regulatory requirements, laws, or other policies that are required in management of some documents. For example, a life insurance company is required to maintain insurance policies for a particular period of time after the death of the policy holder. Because companies do not want to maintain documents for a longer period of time than required, there is a strong desire to articulate or specify policies such as retention policies.

Conventionally, one stylized version of the classification code comprises a three letter alpha string that identifies a general type (e.g., "ADM" for administrative) and a three number string for the more specific type (e.g., "100" for general memo). For example, "ADM-100" refers to a document that is an administrative memo.

The coding may be applied to the document or group of documents in various manners depending on the medium the document is stored in. For example, if the document is in an electronic format, the coding may be metadata attached to the document. For hard copy documents, the document may be compiled in a box with same type documents, and the box is coded (e.g., classification code is written or barcoded on the box). In embodiments using a barcode, a records management system may coordinate and/or identify the barcode (e.g., barcode from Box1 indicated that Box1 contains ADM-100 documents. The coding may link the document or set of documents to a retention policy and schedule for disposal.

The use of the traditional classification codes tends to work well when a company is only located in one jurisdiction, geography, or business or needs only one retention schedule for documents within a particular code regardless of where they are created or stored. In situations where the company exists in multiple jurisdictions and/or geographies (e.g., country, state, county), each jurisdiction may have very different laws or regulations. These different laws or regulations may dictate, as examples, different retention policies, different security policies, and different access policies for the same document type.

For example, UK requirements for retaining an account ledger (e.g., classification code "ACC-200") may be different then U.S. requirements for the same type of document. The same may be true for different business units within the same jurisdiction independent of legal or regulatory requirements. Thus, the company cannot rely strictly on document type classification coding as the only or primary linkage to retention or other policies, as the document type classification coding does not provide sufficient dimensions to address geographic, business unit, or jurisdictional distinctions around which policy can be articulated or specified and with which documents (electronic or physical) can be thus coded.

In order to solve this problem, one prior art method utilizes an ad hoc tagging scheme. For example, a document is initially tagged with the traditional document type classification code. A user may append more tagging codes such as customer code or office code resulting in more attributes. Thus, a plurality of classification codes is associated with each document (e.g., "ADM-100" with client "BankX" and location "NYC"). Disadvantageously, this method does not work well when companies merge or if the law changes for a certain type of documents. Additionally, ad hoc tagging is generally not easily tracked because each user may apply their own unique tags and attributes (e.g., one user may use "NYC" while a second user may note location as "New York"). A traditional management system and traditional approaches are not designed or configured to track, store, retrieve, or manage either policies or documents in this ad hoc manner.

Therefore, there is a need for a classification code system that incorporates locality/jurisdiction data into the classification code.

SUMMARY OF THE INVENTION

Embodiments of the present invention provide systems and methods for classifying a document utilizing an organization-specific classification code (OSCC). The OSCC is a classification code based on an information type and an organization. The organization may be physical, structural, or logical.

In some embodiments, one or more policies may be associated with the OSCC. All documents having the same OSCC are subject to the same policies. These policies may comprise a retention period for various instances of information thus classified, custodian (i.e., storage location), record manager(s), and other important information which is pertinent to all documents sharing the OSCC. Additionally, the policy may also comprise information such as a disposal period, security and access, and legal holds.

The system may comprise a locality module configured to identify a locality element in determining correct usage of the OSCC. In some embodiments, the locality module identifies a subset of OSCCs that a particular user is allowed to select based on the locality element. The locality element may comprise an author of the document, the author being affiliated with the organization or an individual assessing the document (e.g., a document classifier, etc.). Alternatively, the locality element may be a location of the document, the location being affiliated with the (logically or physical) organization.

DETAILED DESCRIPTION OF EXEMPLARY EMBODIMENTS

Embodiments of the present invention provide an exemplary system for utilizing an organization-specific classification code (OSCC). The OSCC identifies both a record or information type and a physical or logical organization as, or with, a single classification code. Any number of business or logical organizations may comprise an enterprise (e.g., company). Exemplary systems also allow a user to define a policy in terms of one jurisdiction or logical organization as distinct from another using the OSCC. The use of OSCCs also allows the user to find, based on the business or logical organization, types of documents operated upon by the organization.

Figure 1:
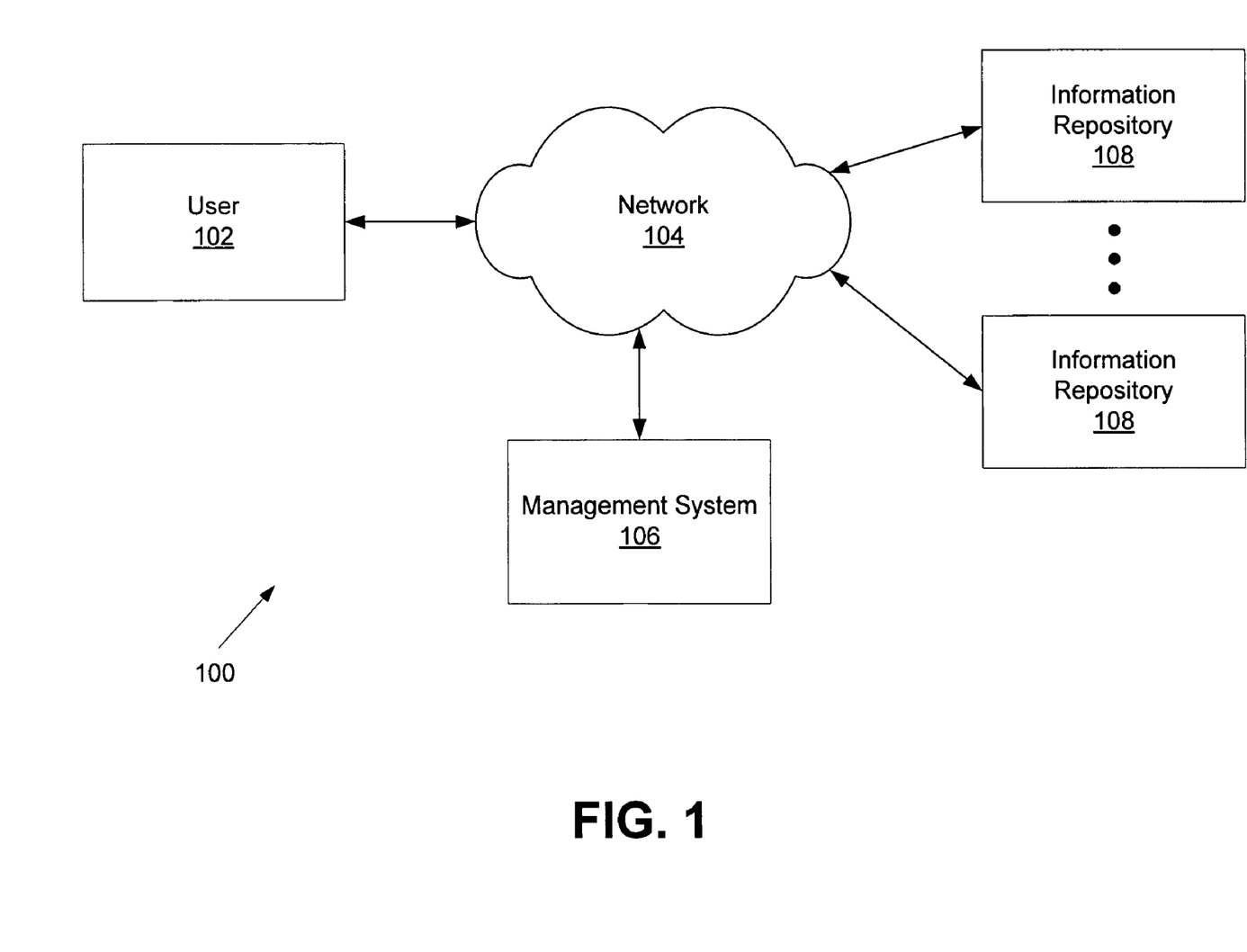
FIG. 1 is an exemplary environment in which embodiments of the present invention may be practiced.

FIG. 1 shows an exemplary environment 100 in which embodiments of the present invention may be practiced. The environment 100 comprises at least one user 102 coupled via a network 104 to a management system 106. A plurality of information repositories 108 (e.g., storage, warehouses, etc.) are also coupled to the management system via the network 104. In various embodiments, the network 104 may be a local area network, a wide area network, the Internet, or a physical network of people, devices, and locations. In some embodiments, more than one network and/or more than one type of network may be utilized to allow the components of the environment 100 to communicate with each other.

Any number of users 102 may be present in the environment 100. The user 102 is an individual accessing the management system 106 in order to perform some action to, or with, one or more documents. In one example, the user 102 is an individual creating or modifying a document. In other examples, the user 102 is an individual responsible for classifying the documents, managing the documents, or implementing a policy on some of the documents. In another example, the user 102 is an individual creating, reviewing or modifying policy regarding some of the documents or data stored in one or more repositories 108.

The exemplary management system 106 manages the documents stored in the information repository 108. The management system 106 will be discussed in more detail in connection with FIG. 2.

Any number of information repositories 108 may be coupled to the management system 106. The information repository 108 contain the documents or information elements/data (e.g., electronic or physical_files, emails, papers, digital media, back up tapes, etc.) classified using the OSCC. These information repository 108 may be located anywhere in an enterprise (e.g., in different jurisdictions) or in a third-party information repository off corporate premises. The information repository 108 may comprise both physical and electronic storage media, including warehouses, filing cabinets, hard drives, and other paper, physical or digital media storage devices which may or may not be coupled to the network 104.

Figure 2:
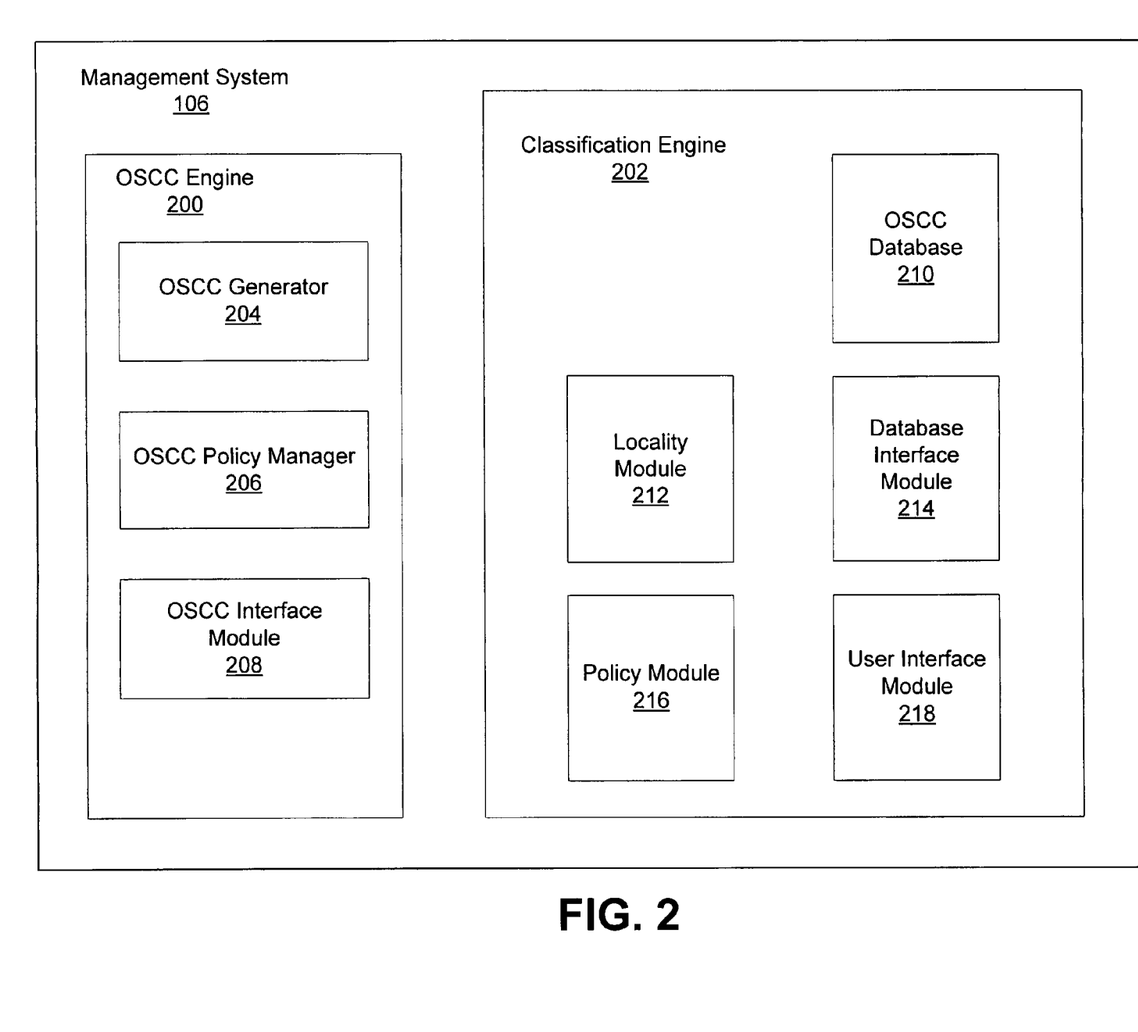
FIG. 2 is a block diagram of an exemplary management system.

Referring now to FIG. 2, a block diagram of the exemplary management system 106 is shown. The management system 106 may comprise an OSCC engine 200 and a classification engine 202 coupled in communication. In some embodiments, some of the components of the management system 106 are located at a device (e.g., computing device) associated with the user 102 and operate within the device to provide the functionalities described below. In other embodiments, the management system 106 is completely located at the device associated with the user 102. In yet other embodiments, the management system 106 is completely separate from the device of the user 102.

The exemplary OSCC engine 200 creates and maintains the OSCC used by the classification engine 202. In exemplary embodiments, the OSCC engine 200 comprises an OSCC generator 204, an OSCC policy manager 206, and an OSCC interface module 208. The OSCC generator 204 generates the OSCC. In exemplary embodiments, organizations or organizational units may be segmented out of a larger organization (physical enterprise or logical group as a whole). The organizations can comprise business units in different jurisdictions (e.g., countries, states, and counties) or having different business functions and requirements independent of legal or regulatory requirements, or other logical relationships and segmentations. Information types may then be associated with each organization. The creation of OSCCs will be discussed in more detail below in connection with FIG. 4a to FIG. 4c.

In exemplary embodiments, a policy may be associated with the created OSCC. That is, for example, default retention, storage, or record keeping guidelines may be associated with the created OSCC. These policies are initially generated and assigned to the created OSCC via the OSCC policy manager 206. All documents having the particular OSCC are subject to the same policy. These policies may comprise a custodian (i.e., storage location), a record manager, and other important information which is pertinent to all documents sharing the OSCC. For example, the policy may also comprise information such as a retention period, security and access, and legal holds. Policies are discussed in more detail in connection with FIG. 3.

The OSCC engine 200 also allows for revisions to be made to existing OSCCs via the OSCC generator 204. For example, if a single organization is split into two new organizations, an organization associated with an existing OSCC may be changed. Similarly, policies associated with an OSCC upon creation may be revised via the OSCC policy manager 206. In exemplary embodiments, the OSCC engine or some other component tracks these historical changes and provides change management during reorganizations.

In some embodiments, the OSCC interface module 208 is an interface to the device the user 102 is using to interact with the OSCC engine 200. In other embodiments, the OSCC interface module 208 provides a graphical user interface through which the user 102 can interact with the other components of the OSCC engine 202 to create the OSCC and associated policies. Screen shots of some graphical user interfaces will be discussed in more detail in connection with FIG. 4a-FIG. 4c.

The classification engine 202 is configured to classify the documents and data in the enterprise using the OSCCs. In exemplary embodiments, the classification engine 202 comprises an OSCC database 210, a locality module 212, a database interface module 214, a policy module 216, and a user interface module 218.

The OSCC database 210 stores the OSCCs. In exemplary embodiments, OSCCs created by the OSCC engine 200 via the OSCC generator 204 are "published" to the classification engine 202 and thus stored into the OSCC database 210. When a user 102 classifies a document, the OSCC database 210 is accessed to provide the appropriate OSCCs, as will be discuss below.

The locality module 212 provides the locality based element to embodiments of the present invention. In exemplary embodiments, the locality module 212 identifies specific OSCCs based on the user's locality data (e.g., the business organization or organizations, geographies, or jurisdictions associated with user). As discussed, each user 102 or process that classifies a document may comprise a locality element that associates the user 102 or the process with an organization. For example, one or a few individuals on a merger and acquisition (M&A) team in a New York (NY) office may be responsible for archiving records for M&A deals for their office, according to the appropriate information retention policy. These individuals are functionally assigned only to work in the New York office. Therefore, there is location recognition based on the individual(s) archiving the documents by the locality module 212 (e.g., based upon the individual('s) organizational membership). Because the individual(s) report to the New York office, a classification engine 202 may allow only codes that apply to the New York office to be identified and/or allowed to be applied by the locality module 212.

From a user interface perspective, the user 102 is given a choice that appears to be a traditionally classification code (e.g., "MAA-100"), according to one embodiment. However, implicitly, the classification code is an OSCC representing "MAA-100-NY" because the document is coming from, or associated with, the user 102 from the New York office (e.g., from the user's computer, person, boxes, files, etc.). A similar user 102 at the enterprise's UK office may also have the traditionally classification code "MAA-100" available for use. However, when the UK user 102 applies the "MAA-100" classification code, the locality module 212 will determine, based on the user 102 being associated with the UK office, that the OSCC represents "MAA-100-UK," for example.

In some of these embodiments, the user 102 does not see the locality element in the classification code (e.g., they only see "MAA-100"). Instead, the locality element is embedded into an underlying layer of the management system 106 which tags a document with the OSCC that is uniquely derived with organization and document type, or is otherwise associated with both the organization and document type. In alternative embodiments, the user may have the option to use locality elements in their classification code (e.g., "MAA-100-NY") or provide a selection that is associated with a locality (e.g., classify as "MAA-100" and select location "NY" in a user interface).

In further embodiments, specific OSCCs are only available for certain business organizations. For example, "ADM-200" may only be used in the New York office. In some of these embodiments, the locality module 212 implicitly determines the users 102 locality element and provides only an appropriate subset of OSCCs (e.g., only New York OSCCs to a New York user 102). In other embodiments, the locality module 212 may also consider the user (102) geography in determining the appropriate OSCCs.

The locality module 212 narrows the OSCC choices available to the user 102 and may also validate any classifications made by the user 102 so that documents are coded properly. For example, if the user 102 associated with the UK office tries to manually code a document with "ADM-200" (e.g., administrative memo—New York), the locality module 212 may reject this classification.

In an embodiment where the user 102 is associated with more than one business organization, the user 102 may be presented with sets of classification codes for each business organization with which they are associated. For example, if the user is associated with both the New York office and a European office within the enterprise, the user 102 may see or use both sets of OSCCs. Thus, for example, "ADM-100-NY" and "ADM-100-EU" may be classification codes that the user 102 can use. In an alternative embodiment, the user may apply the OSCC "ADM-100" and specify the organization (e.g., NY or EU).

The database interface module 214 provides access to the information repositories 108. In exemplary embodiments, a user 102 may search for documents having a particular OSCC. The database interface module 214 can access the information repositories 108 and find the specific documents, returning one or more documents (or a list of documents) to the user 102.

The exemplary policy module 216 allows a user 102 to view and, in some embodiments, apply annotations to policies associated with an OSCC.

In some embodiments, the user interface module 218 is an interface to the device the user 102 is using to interact with the classification engine 202. In other embodiments, the user interface module 218 provides a graphical user interface through which the user 102 can interact with the other components of the classification engine 202.

The management system 106 is exemplary. Alternative embodiments may comprise more, less, or functionally equivalent components. While the embodiment of FIG. 2 shows a separate OSCC engine 200 and classification engine 202 within the management system, alternative embodiments may comprise a single engine combining the functionalities of both engines 200 and 202, or may comprise a single OSCC engine 200 and a multiplicity of Classification engines 202. In yet other embodiments, the OSCC engine 200 and classification engine 202 may be located in different management systems 106 coupled to the network 104, and may be used by different users 102 or groups of users. Furthermore, other embodiments may have a multiplicity of management systems 106 each responsible for different policy elements (e.g., security, retention, privacy), where the management systems use a common OSCC generator and database to create multi-part policies for a single OSCC. In further embodiments, some of the functionalities and components of the OSCC engine 200 and the classification engine 202 may be combined. For example, the functionalities of the OSCC interface module 208 and the user interface module 218 may be combined into a single module.

Figure 3:
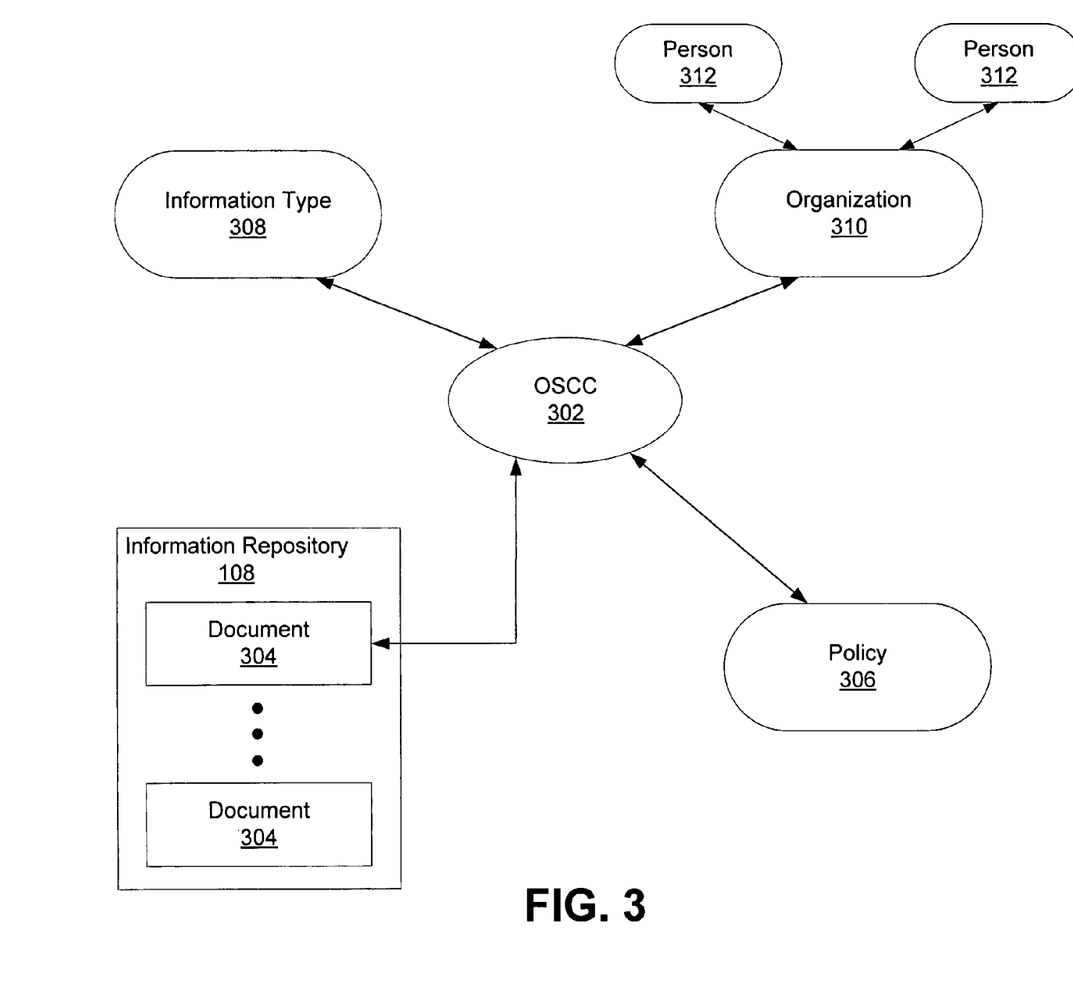
FIG. 3 is a block diagram showing association of code elements of an organization-specific classification code.

Referring now to FIG. 3, a block diagram showing association of code elements of an organization-specific classification code (OSCC) 302 is schematically illustrated. The OSCC 302 establishes a relationship between a document 304, a policy 306, information type 308, and organization 310. Because the organization 310 comprises persons 312 (e.g., users 102), the persons 312 are thus associated with the OSCC 302. Further, in some embodiments, specific information repositories 108 are associated with specific organizations 310, therefore the information repositories 108 are associated with the OSCC 302.

The policy 306 comprises additional information which is applicable to all documents 304 sharing the same OSCC 302 in the organization 310. In exemplary embodiments, the policy 306 may indicate a custodian (i.e., a storage location), retention rules, and a records manager (i.e., a person responsible for management). The policy 306 may also indicate guidelines for actions associated with the OSCC 302 such as retention, disposal, or certification guidelines. For example, documents 304 having a particular OSCC 302 may have a policy 306 which requires the documents 304 be retained for seven years.

Because the policy 306 is associated with the OSCC 302, and therefore indirectly with the organization 310 and information type 308, each organization 310 can manage different policies 306 for their own documents 304 independent of other organizations 310 in the enterprise. Thus, for example, legal exceptions around local laws can be incorporated in the policy 306 of a Malaysian bank office for a specific information type 308 which will not affect the same information type at the parent US bank office. As a further example, if new legislation that affects record keeping is implemented, the policy 306 for the affected information type 308 and locality of the new legislation (i.e., organization 310) can be modified in isolation of other information types 308 and organizations 310. Additionally, embodiments of the present invention allow for organization-specific operational policies per information type to be established (e.g., what information repository the document should be stored in).

In a relational database embodiment, the policy 306 record may be stored separate from the OSCC 302, but the policy 306 and the OSCC 302 will have references to each other in the relational database.

Advantageously, the OSCC 302 provides a significant improvement over the prior art approaches to classifying documents with only an information type (e.g., sales invoice). The OSCC 302 reconciles differences in retention/disposal regulations in different jurisdictions or different business requirements for information retention across the enterprise.

Different enterprises and systems classify documents 304 at different points in the document lifecycle. In some embodiments, an author can classify the document 304 at the point of creation, thus identifying the information type 308. Utilizing embodiments of the present invention, the classification now includes a locality element which may be inherent. For example, a subset of OSCCs may be identified for an author inherently based on an organization affiliation of the author (e.g., the author only works in the New York office and therefore only utilizes OSCCs for the New York organization).

Exemplary embodiments may comprise OSCCs that apply to a single organization or to a larger (i.e., parent) organization comprising a plurality of sub-organizations (i.e., a so-called "scope" of the OSCC, which may be a single organization or an organizational tree). For example, a single OSCC may be defined for the larger organization scope (e.g., Western Sales organization tree) without having to also be defined for each sub-organization (e.g., California Sales, Oregon Sales, etc.) within the larger organization. The sub-organizations may inherit the parent organization's OSCCs and their policies, where the sub-organization is within the scope of the OSCC definition. Similarly, modifications to a (master) OSCC or policy of the parent organization will flow to the sub-organizations. Therefore, an OSCC which applies to all sub-organizations within a larger organization only needs to be defined once for the larger organization, greatly simplifying maintenance and management.

In other embodiments, the documents may be classified by a record keeper after document creation. Pattern recognition may be utilized by the record keeper to aid in the classification. For example, the record keeper can look at the author, sender, or receivers of a document and infer the locality element. In this example, the record keeper can determine the organization 310 associated with the sender or determine that the document 304 is only being relayed within a single organization 310. In exemplary embodiments, the record keeper is an individual. In other embodiments, the record keeper may be a software tool.

Pattern recognition may also be utilized to identify the information type 308. For example, the record keeper may know from viewing a document 304 that it is a form for a sales invoice or an IP deal pitchbook having a recognized appearance, content, or file name. In addition, the storage location, file owner, or other information may indicate the organization that owns the document. As a result, these documents 304 may be implicitly classified by appearance, content, or file name and organization, allowing the correct identification of appropriate OSCC. Thus, the record keeper will, for example, file the document 304 in a correct box associated with the appropriate information type and organization.

In embodiments with automated information type classification systems, the system can derive the organization 310, in addition to information type 308, in order to select the appropriate OSCC 302 for the document 304. For example, the information type 308 may be derived from pattern recognition. The organization 310 can be derived from document location (e.g., file shares and other information repositories utilized by a small number of organizations) or document meta-data (e.g., file owner, document author, etc.). With document meta-data, an author, for example, has an affiliation with an organization 310 which thereby allows correct coding of the document with the appropriate OSCC 302.

Thus, embodiments of the present invention classify a document 304 based on the information type 308 and the organization 310. The classification may be applied by a person, a software application, any other mechanisms, or any combination of these different record keepers.

Because the OSCC 302 provides an intrinsic relationship between the organization 310, information type 308, and policy 306, a user 102 is able to develop, sustain, and apply policies far more efficiently in complex enterprises. Based on people, custodians, organizations 310, or information types 308 known to be relevant to a legal matter, for example, the subset of all OSCCs 302 can be derived that are relevant to the legal matter. More specifically, the user 102 can search for a specific OSCC 302 and identify systems, people, and information associated with the legal matter. Additionally, the user 102 can search for and identify exact documents 304 or data that are classified with a given OSCC 302. The search may be performed by a search module (not shown) in the management engine 106, for example.

In exemplary embodiments, the user 102 may initiate a policy change, via the policy manager 206, for the OSCC 302 as a whole. The policy change may alter, enable or prevent some action with regards to the associated documents 304 or OSCC 302. In one embodiment, the policy change is a legal hold that prevents the destruction of the identified documents for preservation and production purposes related to a legal action. The policy change is incorporated into the policy 306. In some embodiments, a notification based on the policy change is sent to affected people and systems to inform them of the change in policy. In other embodiments, workflow may be generated or processed, such as is necessary to approve, institute, or otherwise process the policy change. For example, if the policy change requires legal approval before it is instituted, notification and workflow may be used together to route legal review tasks and approval requests to appropriate legal reviewers, and to notify all involved parties of the approval process status as the review and approval is workflow is executed. In another example, the policy change is an addition of safe disposal process instructions for personally-identifiable information, such as consumer or patient data, for all data or documents classified in the specific OSCC 302. Similarly, the policy change may be an addition or alteration to the retention period, the custodial repository, records manager, or other policy element for that type of data in that physical or logical organization 310.

In a more specific example, a legal team looking for accounting records for Western US Sales does not have to search through all accounting records. Instead, the legal team accesses a search tool (e.g., search module) that searches based upon the OSCC 302. Furthermore, the OSCC 302 and its policy 306 may provide specific locations (custodians and repositories) within which to conduct the search, saving time in determining where data may be located. In some embodiments, the search tool may also allow searches based on key words, data location, content indices, and the like.

Figure 4A:
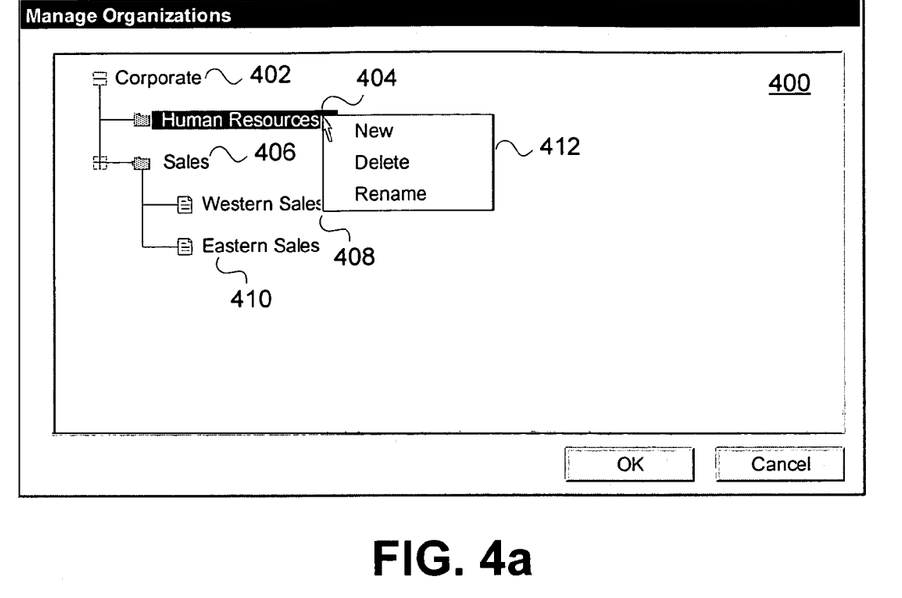
FIG. 4a is an exemplary screen shot of a GUI for managing organizations.

Referring now to FIG. 4a, an exemplary screen shot of a graphical user interface (GUI) 400 for managing organizations within the enterprise is shown. The organization GUI 400 provides a means for a user 102 to create, edit, and delete organizations (e.g., organization 310) in an enterprise or logical hierarchy. As shown, under a corporate 402 organization of the enterprise are human resources and sales organization, 404 and 406, respectively. Within these organizations 404 and 406, further organizations may be created. For example, the sales organization 406 comprises a western sales organization 408 and an eastern sales organization 410. These are given as examples only and any number of nested organizations and sub-organizations can be created to model physical, structural, or logical relationships within the enterprise.

With respect to the human resources organization 404, the user 102, as shown, can create (i.e., new), delete, or rename organizations within the human resources organization 404. In the present embodiment, an options window 412 is presented to a user 102 for creating, deleting, and renaming the organization. It should be noted that user 102 can create organizations at any level within the enterprise. For example, if there is only a single human resources department for the entire enterprise, the lowest level organization that needs to be associated with this department is a human resources organization 404. Other organizations, such as the sales organization 406, may require further distinctions resulting in lower level organizations (i.e., western sales and eastern sales organizations 408 and 410).

In some embodiments, the user 102 can also move organizations within the hierarchy. The organizations may be moved by, for example, dragging and dropping an element identifying the organization into a different location on the hierarchy. This "virtual" reorganization of lower level organizations (e.g., a sub-organization) associates elements of a new parent organization to the moved, lower level organization. These elements may include, but are not limited to, the people (person 312) employed within the organization or associated with the organization and the business systems and information repositories 108 used in the organization. The reorganization also causes policies 306 associated with the new parent organization to be inherited by the lower level organization.

Figure 4B:
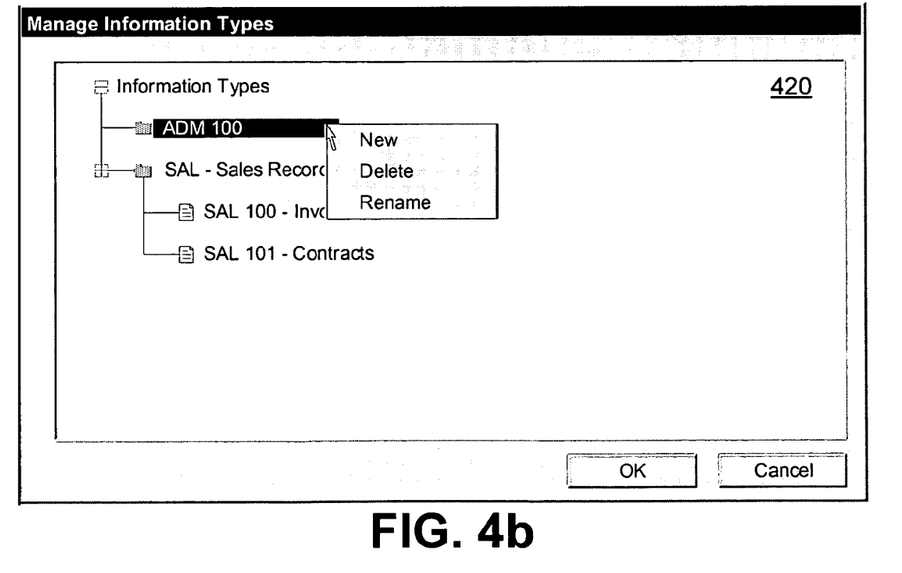
FIG. 4b is an exemplary screen shot of a GUI for managing information types.

FIG. 4b is an exemplary screen shot of a GUI 420 for managing information types. The information type GUI 420 allows the user 102 to create, delete, and rename information types within the enterprise hierarchy. The user 102 may also reorganize information types by moving (e.g., dragging and dropping) elements indicating the information type within the hierarchy. Further embodiments of may include additional features to manage information types, such as an ability to organize types (e.g., into a taxonomy of types), an ability to create standardized policy templates associated with a type, for use in subsequent OSCC creation, and other common utility functions.

Figure 4C:
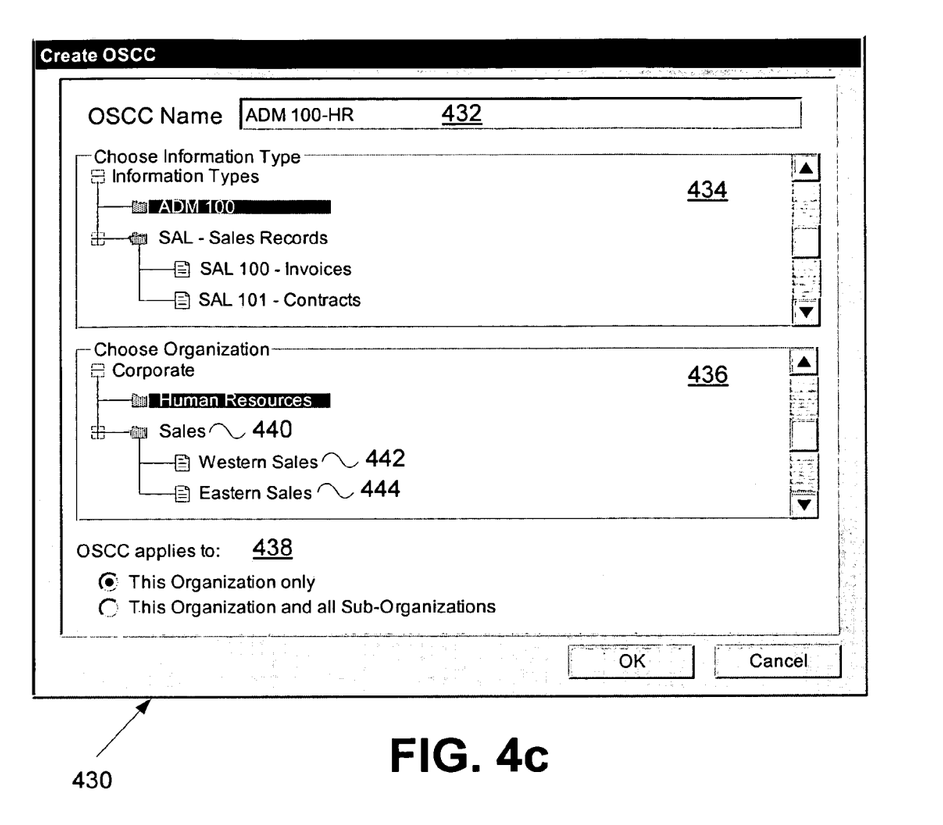
FIG. 4c is an exemplary screen shot of a GUI for creating organization-specific classification codes.

Once the organization 310 and information types 308 have been defined, an organization-specific classification code (OSCC 302) may be generated. Referring now to FIG. 4c, an exemplary screen shot of a GUI 430 for creating the OSCC 302 is provided. The user 102 specifies an OSCC name in a name field 432, specifies an associated information type 308, and specifies an associated organization 310. The information type 308 is chosen in an information type display 434, while the organization 310 is chosen in an organization display 436. As shown, all OSCCs 302 are associated with both an information type and an organization.

In exemplary embodiments, a user 102 can also specify if the OSCC 302 applies to a single organization or to all sub-organizations within a selected organization in an application field 438. For example, a Sales organization 440 may have one or more OSCCs associated with it, which will apply to a Western Sales sub-organization 442 and an Eastern Sales sub-organization 444.

While embodiments of the present invention describe the OSCC 302 having particular naming conventions, the invention is independent of any coding, naming or numbering scheme, and any form of coding or naming may be utilized so long as the OSCC 302 associates an information type and an organization with a document being classified.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for classifying a document or data, comprising:
    executing instructions stored in memory by a processor to access a database comprising at least one organization specific classification code (OSCC), the OSCC comprising a single searchable classification code that identifies both an information type of the document or data, as well as the organization associated with the document or data;
    executing instructions stored in memory by the processor to automatically associate a locality element to the document or data, wherein the locality element is determined utilizing pattern recognition based on at least one of an author, sender, and receiver of the document or data to infer the locality element, the locality element associating the document or data with the organization;
    executing instructions stored in memory by the processor to assign an OSCC from the database to the document or data based in part on the locality element, the assigned OSCC being associated with the information type and the organization; and
    executing instructions stored in memory by the processor to store the document or data in an information repository.

2. The method of claim 1 further comprising executing instructions stored in memory by the processor to associate a policy with the assigned OSCC.

3. The method of claim 2 wherein the policy provides storage, record keeping, privacy, legal or retention rules.

4. The method of claim 2 further comprising executing instructions stored in memory by the processor to apply a policy change to the assigned OSCC.

5. The method of claim 4 further comprising executing instructions stored in memory by the processor to provide a notification associated with the policy change.

6. The method of claim 4 further comprising executing instructions stored in memory by the processor to process workflow associated with the policy change.

7. The method of claim 4 further comprising executing instructions stored in memory by the processor to obtain approval for a change in policy.

8. The method of claim 1 further comprising executing instructions stored in memory by the processor to generate the OSCC by selecting the information type and the organization associated with the OSCC.

9. The method of claim 8 wherein the organization comprises a plurality of sub-organizations.

10. The method of claim 1 wherein executing instructions stored in memory by the processor to assign the OSCC comprises executing instructions stored in memory by the processor to select from a subset of all OSCC, the subset based upon at least one locality element.

11. The method of claim 10 wherein the locality element is an author of the documents or data, the author being affiliated with the organization.

12. The method of claim 10 wherein the locality element is a location of the document or data, the location being affiliated with the organization.

13. The method of claim 10 wherein the locality element is a person classifying the document or data, the person being affiliated with the organization.

14. The method of claim 1 wherein the organization comprises a jurisdiction.

15. The method of claim 1 wherein the organization comprises a geography.

16. The method of claim 1, further comprising:
in response to a search query comprising the OSCC, executing instructions stored in memory by the processor to locate and retrieve the document from the information repository based on the OSCC.

17. A system for classifying a document or data, comprising:
an organization specific classification code (OSCC) engine stored in memory and executable by a processor to generate and maintain OSCCs, each OSCC being associated with an information type and an organization, each OSCC comprising a single searchable classification code that identifies both an information type of the document or data, as well as the organization associated with the document or data;
an OSCC database configured to store the generated OSCCs; and
a locality module stored in memory and executable by the processor to automatically associate a locality element to each document or data, wherein the locality element is determined utilizing pattern recognition based on at least one of an author, sender, and receiver of the document or data to infer the locality element, the locality module further configured to automatically associate the document or data with the organization.

18. The system of claim 17 wherein the OSCC engine comprises an OSCC generator stored in memory and executable by the processor to generate the OSCCs.

19. The system of claim 17 wherein maintaining the OSCCs comprises editing, moving, or deactivating at least one of the OSCCs.

20. The system of claim 17 further comprising an OSCC policy manager stored in memory and executable by the processor to define a policy for the OSCC.

21. The system of claim 20 wherein the policy comprises a retention policy.

22. The system of claim 17 further comprising a classification engine stored in memory and executable by the processor to classify the document or data using the OSCC.

23. The system of claim 17, further comprising:
in response to a search query comprising the OSCC, a search module stored in memory and executable by the processor for locating and retrieving the document from the information repository based on the OSCC.

24. A system for classifying a document or data, comprising:
a locality module stored in memory and executable by a processor to automatically associate a locality element to the document or data, wherein the locality element is determined utilizing pattern recognition based on at least one of an author, sender, and receiver of the document or data to infer the locality element, the locality module further configured to automatically associate the document or data with an organization;
a classification engine stored in memory and executable by the processor to classify the document or data using an organization specific classification code (OSCC) based in part on the locality element, the OSCC being associated with an information type and the organization and the OSCC comprising a single searchable classification code that identifies both an information type of the document or data, as well as the organization associated with the document or data; and
an information repository configured to store the classified document or data.

25. The system of claim 24 wherein the locality module is configured to determine one or more OSCCs based upon a locality element associated with the one or more OSCC.

26. The system of claim 24 wherein the locality element is a location of the document or data, the location being affiliated with the organization.

27. The system of claim 24 wherein the locality element is a person classifying the document or data, the person being affiliated with the organization.

28. The system of claim 24, further comprising:
in response to a search query comprising the OSCC, a search module stored in memory and executable by the processor for locating and retrieving the document from the information repository based on the OSCC.

29. A non-transitory computer readable storage medium having embodied thereon instructions, the instructions being executable by a processor to perform a method for classifying a document or data, the method comprising:
accessing a database comprising at least one organization specific classification code (OSCC);
automatically associating a locality element to the document or data, wherein the locality element is determined utilizing pattern recognition based on at least one of an author, sender, and receiver of the document or data to infer the locality element, the locality element associating the document or data with an organization;
assigning an organization specific classification code (OSCC) to the document or data based in part on the locality element, the assigned OSCC being associated with an information type and the organization, the OSCC comprising a single searchable classification code that identifies both an information type of the document or data, as well as the organization associated with the document or data; and storing the document or data in an information repository.

30. The computer readable storage medium of claim 29, the method further comprising:
in response to a search query comprising the OSCC, locating and retrieving the document from the information repository based on the OSCC.

31. A method for classifying a document, comprising:
executing instructions stored in memory by a processor to access a database comprising an organization specific classification code (OSCC), the OSCC configured to provide an intrinsic relationship between the document, a policy, an information type, and an organization;
executing instructions stored in memory by the processor to automatically associate a locality element to the document with the organization, wherein the locality element is determined utilizing pattern recognition based on at least one of an author, sender, and receiver of each document or data to infer the locality element;
executing instructions stored in memory by the processor to assign an OSCC from the database to the document based in part on the locality element, the assigned OSCC being associated with the information type and the organization, the OSCC comprising a single searchable classification code that identifies both an information type of the document or data, as well as the organization associated with the document or data, wherein all documents having the assigned OSCC are subject to the same policy; and
executing instructions stored in memory by the processor to store the document in an information repository.

32. The method of claim 31, wherein the OSCC is selectively applied to either the organization or to sub-organizations within the organization.

33. The method of claim 31, wherein the locality element is selectively shown to a user as part of the OSCC or hidden from the user.

34. The method of claim 31, further comprising:
in response to a search query comprising the OSCC, executing instructions stored in memory by the processor to locate and retrieve the document from the information repository based on the OSCC.

* * * * *